Sept. 14, 1926.  V. CLAIREMONT  1,599,553
GRADING AND CANDLING MACHINE
Filed August 25, 1925    2 Sheets-Sheet 2
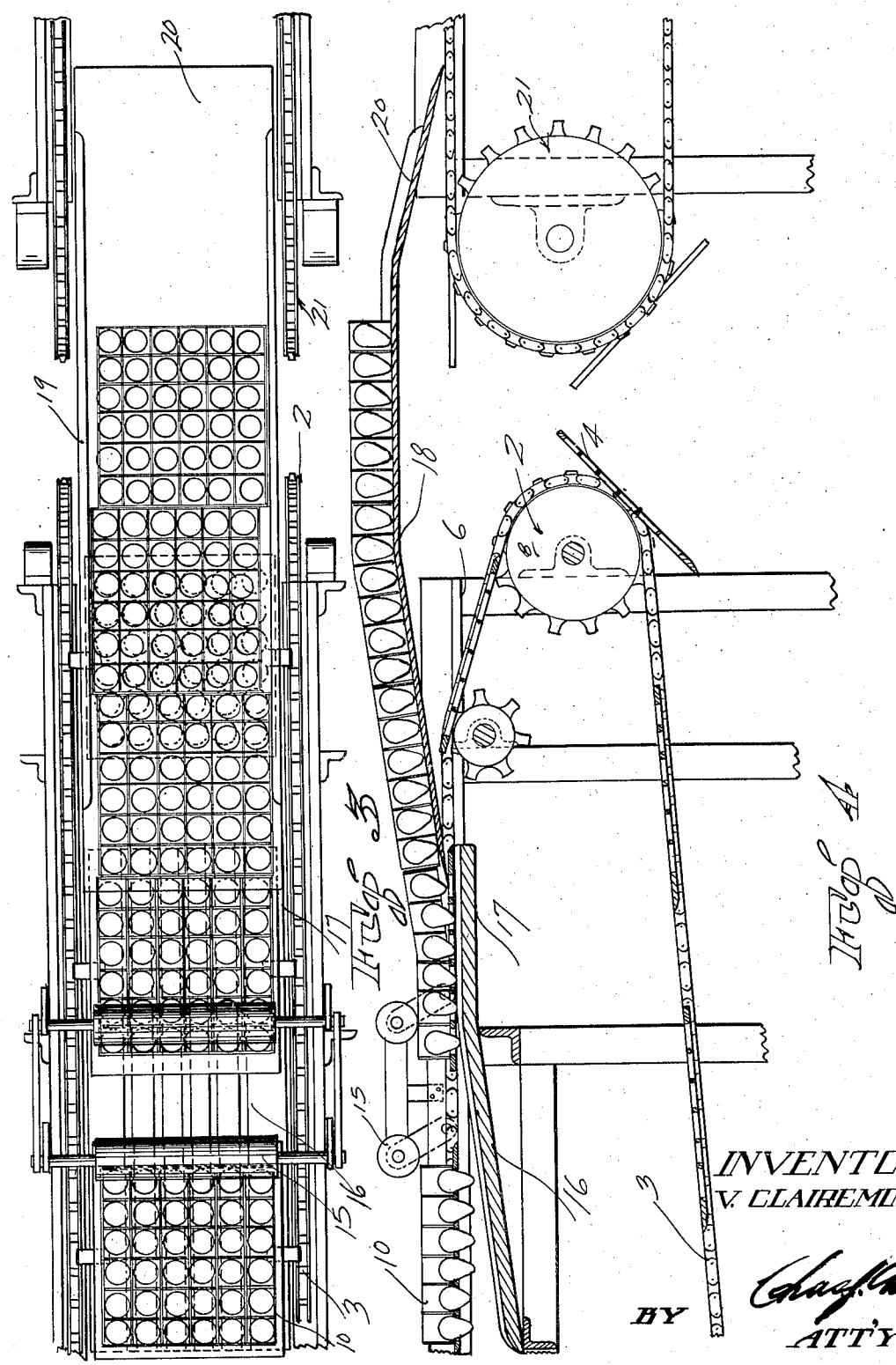
INVENTOR
V. CLAIREMONT
BY
ATT'Y.

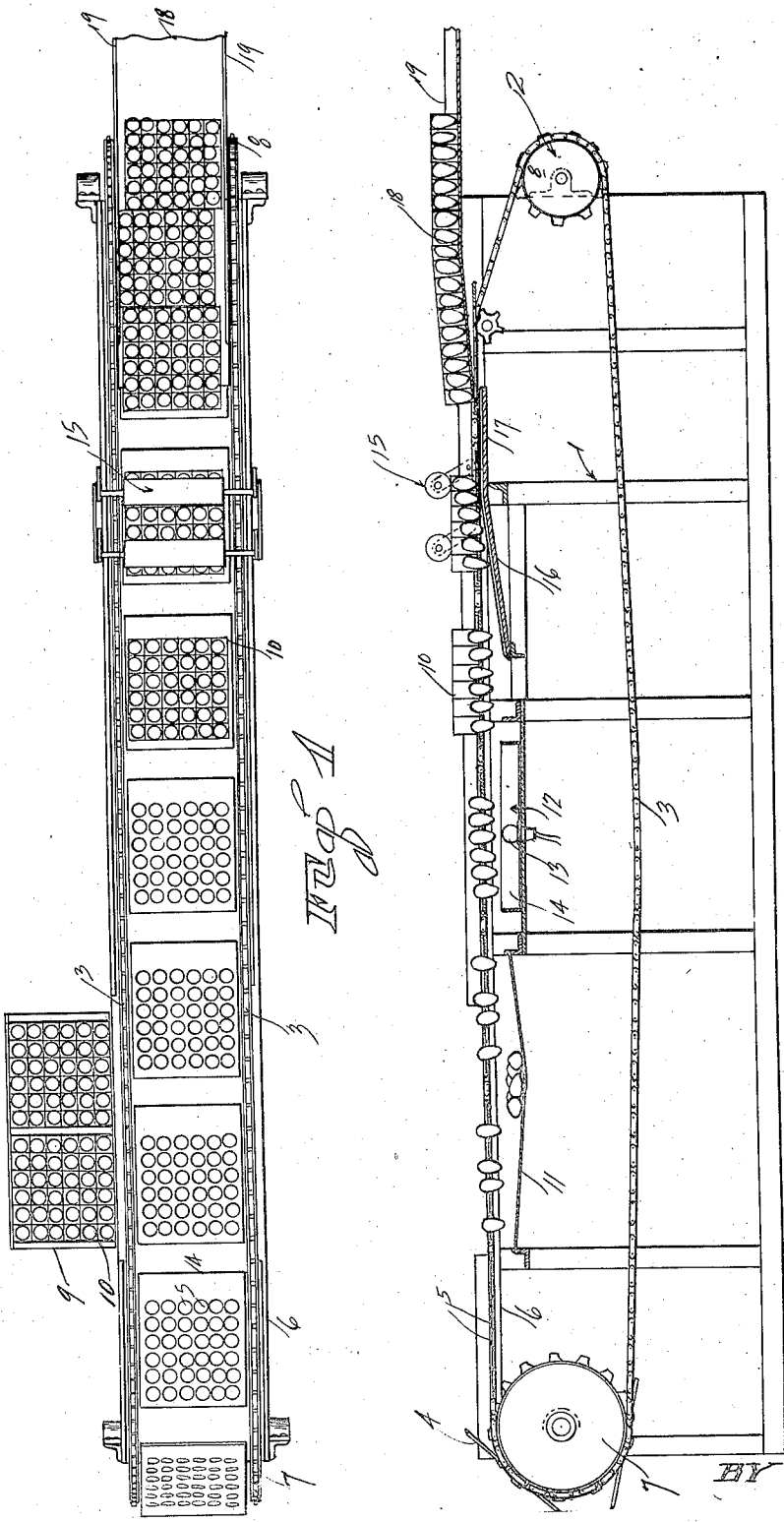

Patented Sept. 14, 1926.

1,599,553

UNITED STATES PATENT OFFICE.

VICTOR CLAIREMONT, OF OAKLAND, CALIFORNIA.

GRADING AND CANDLING MACHINE.

Application filed August 25, 1925. Serial No. 52,282.

This invention resides in the provision of a simple and efficacious machine by means of which large quantities of eggs may be quickly graded and candled during continuous movement of eggs through the machine, in the usual three dozen units and without breaking or cracking the eggs.

The invention also takes into consideration the provision of a machine of the character described wherein the eggs may be more easily and safely handled and treated with the machine, in larger quantities, in less time and with less labor than has heretofore been possible in the grading and candling of eggs.

In the handling of eggs for shipment or storage, particularly preparatory to the processing of eggs as is now commonly practiced, it is preferable if not necessary, to grade or size the eggs and candle them before the processing or preserving treatment. The present machine is designed to operate for the purpose of grading and candling the eggs preliminary to their being processed and provides for very expeditious and reliable grading operations whereby the eggs which are delivered to the processing machine are of select grades, free from cracks and other objectionable qualities.

When the eggs are delivered for grading they are in the ordinary crates in units of three dozen each, and contained in fillers which are separated by cardboard flats. It is preferable to maintain the eggs in these three dozen units during the handling of the eggs by machinery from the point of taking the eggs out of the crates up to the point of putting them back into the crates thoroughly graded and processed. The maintaining of the eggs in the regular three dozen units insures a saving in time and labor in the handling of large quantities of eggs. The machine of this invention provides for taking the eggs from the crates in three dozen units, quickly placing them in the machine and during continuous operation of the machine causing the eggs to be graded and candled and delivered onto the unloading platform or bridge from which the eggs may be taken off by hand or fed into another m chine, for example, a processing machine.

One of the advantages of the machine of this invention is the provision for quickly moving the eggs into position to be operated on by the machine, then removing the fillers whereby the eggs may be effectively candled and graded; then placing the fillers back upon the eggs and causing the eggs and fillers to be automatically combined so that the said eggs and fillers will be automatically discharged from the machine onto the unloading platform and if desired, automatically advanced on said platform from the grading machine into another machine, for example, a processing machine.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a top plan view of the machine of this invention.

Fig. 2 represents a side elevation of the machine of the invention.

Fig. 3 represents an enlarged fragmentary plan view of the machine.

Fig. 4 represents an enlarged sectional view of a part of the machine shown in Fig. 3, being that part which automatically discharges the eggs from the machine onto the unloading platform.

The embodiment of the invention shown in the accompanying drawings comprises a suitable frame work generally designated 1, on which is mounted an endless conveyor 2 driven from any suitable source of power, not shown. This conveyor comprises sprocket chains 3 between which are mounted a plurality of egg supporting trays or plates 4. Each of these plates is pivoted centrally of its ends to the chains and is provided with thirty-six egg receiving openings 5, of predetermined size, in which openings eggs are to be supported.

The frame work 1 supports on opposite sides of the upper run of the conveyor, tracks 6 for the pivoted trays 4, which tracks prevent tilting of the trays as they move along the upper run of the conveyor. These tracks terminate adjacent the sprockets 7 and 8 of the conveyor to permit turning of the trays on their pivots as the trays move around the sprockets.

Eggs are loaded onto the conveyor 2 from a crate 9 disposed adjacent to one end of the conveyor and supported by any suitable means, not shown, in position to permit the three dozen egg units in the fillers 10 to be moved sidewise through the open side of a crate onto the conveyor. This is accomplished by grasping the fillers and moving them with the flats beneath the fillers onto the trays 4. The operator then removes the fillers. The smaller eggs will drop through the openings 5 onto a flexible apron 11 provided beneath the upper run of the conveyor adjacent the point where the eggs are loaded onto the trays. The openings are of predetermined size and therefore only those eggs of the desired size will be retained in the trays. As one of the trays is filled and advances towards the other end of the machine the operator prepares to load the next tray in the manner above described so that in this way the operation is virtually continuous. The next operator stands a few feet away from the first operator and candles the eggs as the trays containing them pass over a candling device 12 supported by the frame beneath the upper run of the conveyor. This device comprises a suitable source of illumination 13 and a reflecting device or chamber 14. If the operator detects cracked or bad eggs they are immediately removed and substituted by good eggs placed in the trays by the second operator. Following the candling operation, this operator then places the filler 10 back upon the tray just in advance of suitable means 15 for holding the filler down upon the tray during the advance of the tray with the filler thereon. As the trays advance from the candling station with the filler thereon, they pass over an inclined egg lifting platform 16 disposed below the upper run of the conveyor and adapted to engage the lower ends of the eggs and push them upwardly through the openings in the trays into the compartments in the filler. This action takes place first with the first row of eggs, then with the second row and so on, due to the inclination of the platform 16. In this way the eggs ride over the platform in such a way as to be forced upward through the tray into the filler just at the time that the filler passes beneath the means 15 for holding it down and in place. As a continuation of the inclined platform 16, there is provided a horizontal supporting platform 17 which maintains the eggs in up position.

Extending above the upper run of the conveyor is a downwardly inclined unloading platform 18, the lower end of which is disposed in such relation to the conveyor that as the trays pass over the platform 17, said end will engage on the tops of the trays between them and the lower edge of the fillers and beneath the rows of eggs. Thus as the conveyor advances the fillers with the eggs therein are pushed onto the platform 18 off of the conveyor. The eggs on the next trays together with the fillers, will be pushed against the previously discharged fillers of eggs and in this way the fillers of eggs will be advanced along the platform 18. Flanges 19 are provided on sides of the platform 18 to prevent the fillers from being pushed off the side of the platform.

The platform provides for taking off the eggs properly candled and graded in three dozen units and in the fillers whereby the loading of such units into crates is greatly facilitated. The platform at its discharge end is inclined downward as at 20 so that eggs having been graded and candled may be delivered into another machine 21, for example, a processing machine. In this way the machine of my invention provides for a continuous feeding or loading of eggs into it and a continuous operation while grading and candling the eggs and likewise a continuous operation of delivering the eggs properly graded and candled and in thirty-six egg units with the fillers thereon onto another machine for further treatment of the eggs. However, the eggs may be taken directly from the unloading platform. The machine of this invention requires but two operators. Inasmuch as the operations are carried out while the eggs are continuously moved, a great deal of time and labor are saved and a great quantity of eggs may therefore be treated in a short time. This is made possible by the movement of the eggs extending below the supporting trays over an inclined elevating surface and causing the eggs to be lifted or pushed up through the supporting trays into the fillers and from thence with the fillers off the machine, onto the unloading platform. This operation is automatic and does not require the attention of an operator.

The apparatus for conveying eggs and causing the eggs to be discharged from the conveyor onto the unloading platform while shown in connection with machinery for grading and candling eggs may be used with equal facility in connection with other devices or apparatus for treating eggs other than grading or candling.

It will be noted that the upper sides of the trays are flat and smooth and therefore should a tray move past an operator before he is ready to discharge the filler of eggs from the crate 9 into the tray, the operator may, while retaining the flat beneath the filler, slide the filler and flat forward into the tray which has moved past him and on bringing the filler into proper position and removing the flat, the eggs will drop into the openings in the tray. Before the rows of eggs encounter the lower edge of the platform 18, said eggs rise upon the support 17 but are engaged in the openings of the trays. Therefore, the rows of eggs, towards the rear end of the tray, are engaged with the filler and tray in such manner as to cause the filler containing the eggs to be pushed onto the unloading platform as the tray moves past the adjacent edge of said platform. When the last row of eggs is engaged beneath said edge of the unloading platform and the tray moves past and under said edge, the filler may not be pushed off the tray entirely onto the platform and a part thereof may rest upon the support 17.

However, when the next tray moves into position to unload, the forward edge thereof, which as noted is bevelled, will engage beneath the last row of eggs as said bevelled edge extends beneath the platform and the filler on said advancing tray will engage the preceding filler and push it entirely onto the unloading platform and at the same time advance the other fillers along said platform.

I claim:

1. Apparatus of the character described comprising a conveyor, a plurality of egg supporting trays carried by the conveyor and having a plurality of openings therein adapted to contain eggs with the lower ends of the eggs projecting below the trays and means engaging the eggs during movement of the conveyor and pushing said eggs upwardly through said openings preliminary to removal of the eggs from the trays.

2. Apparatus of the character described comprising a conveyor, a plurality of egg supporting trays carried by the conveyor and having a plurality of openings therein adapted to contain eggs with the lower ends of the eggs projecting below the trays, means engaging the eggs during movement of the conveyor and pushing said eggs upwardly through said openings preliminary to removal of the eggs from the trays and means for automatically removing the eggs from the trays following the pushing of the eggs upwardly through the openings in the trays.

3. Apparatus of the character described comprising a conveyor, a plurality of egg supporting trays carried by the conveyor and having a plurality of openings therein adapted to contain eggs with the lower ends of the eggs projecting below the trays, means engaging the eggs during movement of the conveyor and pushing said eggs upwardly through said openings preliminary to removal of the eggs from the trays and means adapted to engage between the eggs and said trays and into which means said eggs are delievered from the trays during the movement of the conveyor.

4. Apparatus of the character described comprising two machines one of which consists of an endless conveyor having egg supporting trays thereon, said trays having openings therein adapted to contain eggs of a predetermined size, which are placed in said openings, a means with which the eggs engage during movement of the conveyor, which means causes the eggs to be pushed upward through the openings in the trays and an unloading platform adapted to engage between the eggs and said trays and onto which said eggs are advanced on movement of the conveyor, which unloading platform has its discharge end arranged to feed into the other machine.

5. A machine for treating eggs comprising a frame, a conveyor supported by the frame, a plurality of eggs supporting trays carried by the conveyor, each of which trays is provided with egg receiving openings, a filler for containing eggs removably mounted upon each tray and adapted to receive eggs supported in the trays, means for engaging eggs contained in the trays and moving the eggs upwardly into the fillers, and an unloading platform with one edge thereof disposed to engage between the lower ends of the eggs and the upper side of the trays, onto which platform the eggs and fillers are moved from off the trays as the conveyor advances past said edge of the platform.

6. A machine for treating eggs comprising a frame, an endless conveyor operating on the frame, a plurality of egg supporting trays carried by the conveyor, each of said trays having a plurality of egg receiving openings therein, a plurality of egg fillers removably mounted on the trays, means operating as the trays pass a given point for causing eggs supported in the trays to be extended into said fillers and an unloading platform mounted above the conveyor with one edge disposed to engage the upper side of the trays between the lower ends of the eggs and fillers, onto which platform the eggs and fillers are moved as the conveyor advances past said edge of the platform.

7. A machine for treating eggs comprising a frame, an endless conveyor operating on the frame, a plurality of egg supporting baskets carried by the conveyor, each basket having a plurality of egg supporting openings therein, fillers adapted to contain eggs, means for removably holding the fillers on the trays with the openings in the fillers in alignment with the openings in the trays, an unloading platform onto which eggs and fillers are moved off of the trays and means automatically disengaging the eggs and fillers from the trays and causing the eggs and fillers to be pushed onto the platform as the conveyor advances past an edge of the platform.

8. A machine for treating eggs comprising a frame, an unloading platform, a conveyor moving past an edge of the platform, a plurality of egg supporting trays carried by the conveyor arranged to pass beneath and close to said edge of the platform and means operating in advance of said edge of the platform for causing the edge of the platform to engage between the eggs and the trays supporting them whereby the eggs will be pushed onto the platform as the conveyor and trays advance past said edge.

9. A machine for treating eggs comprising a frame, an unloading platform, a conveyor operated in the frame with one run extending past an edge of said platform, a plurality of egg supporting trays carried by the conveyor, an egg filler mounted on each tray and adapted to contain eggs which are supported by the trays, and means for causing the eggs and fillers to be pushed by the trays onto the platform as said trays extend past said edge of said platform.

VICTOR CLAIREMONT.